United States Patent [19]

Ahearn et al.

[11] Patent Number: 5,163,086
[45] Date of Patent: Nov. 10, 1992

[54] TELEPHONE NETWORK CREDIT CARD CALLING APPARATUS AND METHOD OF OPERATION TO DETERMINE VALIDATION AND FRAUDULENT USE OF CREDIT CARDS IN PLACING TELEPHONE CALLS

[75] Inventors: Kathleen M. Ahearn, San Jose, Calif.; Nandakishore A. Albal, Pataskala, Ohio; Daniel D. Cottrell, Geneva, Ill.; Richard M. Harris, Hoboken, N.J.; Julie M. Ladieu-Walton, Lawrenceville, N.J.; Hamid C. Razavi, Highlands, N.J.

[73] Assignee: AT&T Bell Laboratories, Murray Hill, N.J.

[21] Appl. No.: 636,051

[22] Filed: Dec. 31, 1990

[51] Int. Cl.⁵ .......................... H04M 11/00
[52] U.S. Cl. ........................ 379/91; 379/144; 379/145
[58] Field of Search ............ 379/91, 143–145, 379/154, 155, 130–132, 123, 32, 33

[56] References Cited

U.S. PATENT DOCUMENTS

| | | |
|---|---|---|
| 4,162,377 | 7/1979 | Mearns . |
| 4,191,860 | 3/1980 | Weber . |
| 4,439,636 | 3/1984 | Newkirk et al. ............ 379/123 |
| 4,731,818 | 3/1988 | Clark, Jr. et al. .......... 379/91 |
| 4,750,201 | 6/1988 | Hodgson et al. ........... 379/91 |
| 4,893,330 | 1/1990 | Franco ........................ 379/91 |
| 4,935,956 | 6/1990 | Hellwarth et al. .......... 379/155 |
| 4,972,461 | 11/1990 | Brown et al. .............. 379/91 |

Primary Examiner—James L. Dwyer
Assistant Examiner—Wing F. Chan
Attorney, Agent, or Firm—Dwight A. Marshall

[57] ABSTRACT

Apparatus and method of controlling a telephone network to establish connections between calling and called telephone stations in accordance with dialed telephone numbers identified by ones of a plurality of calling party credit cards. The apparatus responds to the receipt of a telephone number and a credit card number from a calling telephone by identifying a company having issued the credit card assigned the received credit card number. A data link connection is established with a data base maintained by the identified company and the received credit card number is transmitted to the identified company during the call sequence for a determination of the validity of the received credit card number. The apparatus controls the telephone network to establish a network connection between the calling telephone and a telephone identified by the called telephone number upon receiving validation of the validity of the credit card and to establish a network connection between the calling telephone and an announcement circuit stating that the identified credit card cannot be used for telephone calls upon receiving non-validation of the credit card or upon identifying the credit card as fraudulent.

16 Claims, 5 Drawing Sheets

FIG. 3

| | CREDIT CARD IDENTITY ← 1010 | |
|---|---|---|
| MATCH | CREDIT CARD CO | VALIDATION DATA LINK |
| 891288 | CREDIT CARD CO 1 | 1050 |
| 4XXXXX | CREDIT CARD CO 2 | 1051 |
| 52XXXX | CREDIT CARD CO 3 | 1052 |
| 340349 | CREDIT CARD CO 4 | 1053 |
| 620XXX | CREDIT CARD CO 5 | 1054 |

FIG. 4

| RECEIVED CREDIT CARD NUMBER | TELEPHONE NUMBER | | CREDIT CARD CO 1 | | | | CREDIT CARD CO 2 | | | | ... | CREDIT CARD CO 5 | | | | CALL COMP |
|---|---|---|---|---|---|---|---|---|---|---|---|---|---|---|---|---|
| | | | VALID | | FRAUD | | VALID | | FRAUD | | | VALID | | FRAUD | | |
| | CALLING | CALLED | YES | NO | YES | NO | YES | NO | YES | NO | | YES | NO | YES | NO | YES NO |
| 8912-88XX-XXXX-XXXX | 614-555-YYYY | 206-555-ZZZZ | ✓ | | | | | | | | | | | | | ✓ |
| 620XXX-XXXX | 614-555-YYYY | 201-555-WWWW | | | | | | | | | | | | ✓ | | ✓ |
| 4XXX-XXXX-XXXX-XXXX | | | | | | | | | | | | | | | | |

| | | | USAGE ← 1012 | | | | | | |
|---|---|---|---|---|---|---|---|---|---|
| CREDIT CARD NUMBER | CREDIT CARD COMPANY | TIME PERIOD | CALLS/TIME PERIOD | THRESHOLD | EXCEED THRESH. | | FRAUD | | ROUTE TO ANC |
| | | | | | YES | NO | YES | NO | YES NO |
| 8912-88XX-XXXX-XXXX | CO 1 | 4 HR | 45 | 70 | | ✓ | | ✓ | ✓ |
| 620XXX-XXXX | CO 5 | 12 HR | 9 | 7 | ✓ | | ✓ | | ✓ |

TELEPHONE NETWORK CREDIT CARD CALLING APPARATUS AND METHOD OF OPERATION TO DETERMINE VALIDATION AND FRAUDULENT USE OF CREDIT CARDS IN PLACING TELEPHONE CALLS

TECHNICAL FIELD

The invention relates to telephone network apparatus and in particular to the control of a telephone network to establish credit card telephone connections.

BACKGROUND AND PROBLEM

Telephone networks respond to a telephone number dialed from a calling telephone by establishing a connection in response to the dialed telephone number between the calling telephone and a called telephone identified by the dialed telephone number. Traditionally, a telephone network identifies the calling telephone and generates billing information that is subsequently transmitted to a subscriber in whose name the calling telephone is listed for payment or requests a calling party at a coin telephone to deposit coins in payment for the telephone call.

Credit cards, such as the AT&T Calling Card, have been issued by telephone companies that enables a calling party having such a card to dial a telephone number of a called telephone and the telephone company credit card number. If the dialed telephone company credit card is valid, a network connection is established between calling and called telephones, and the credit card customer is billed for the telephone call on the customer's telephone billing statement.

Credit card customers desiring to make telephone calls may have several credit cards none of which are credit cards issued by telephone companies. A problem arises in that telephone calls may only be made on telephone company networks by using a credit card issued by the telephone companies. Another problem that arises in using foreign credit cards, i.e., credit cards issued by companies other than telephone companies used to place telephone calls, is determining the validity of foreign credit cards prior to the establishment of a telephone connection.

SOLUTION

In accordance with a preferred embodiment of the invention, the foregoing problems are solved by a telephone network for establishing connections between calling and called telephones in accordance with dialed telephone numbers identified with any one of a number of calling party credit cards. The network responds to the receipt of a telephone number and a credit card number dialed from a calling telephone by identifying a company having issued a credit card assigned the received credit card number. The received credit card number is transmitted to a data base maintained by the identified company for a determination of the validity of the credit card assigned the received credit card number. A network connection is established between the calling telephone and a called telephone identified by the dialed telephone number upon receiving validation of the validity of the credit card and another network connection is established between the calling telephone and an announcement circuit stating that the credit card cannot be used for telephone calls upon receiving non-validation of the credit card.

DETAILED DESCRIPTION

Figure 1:
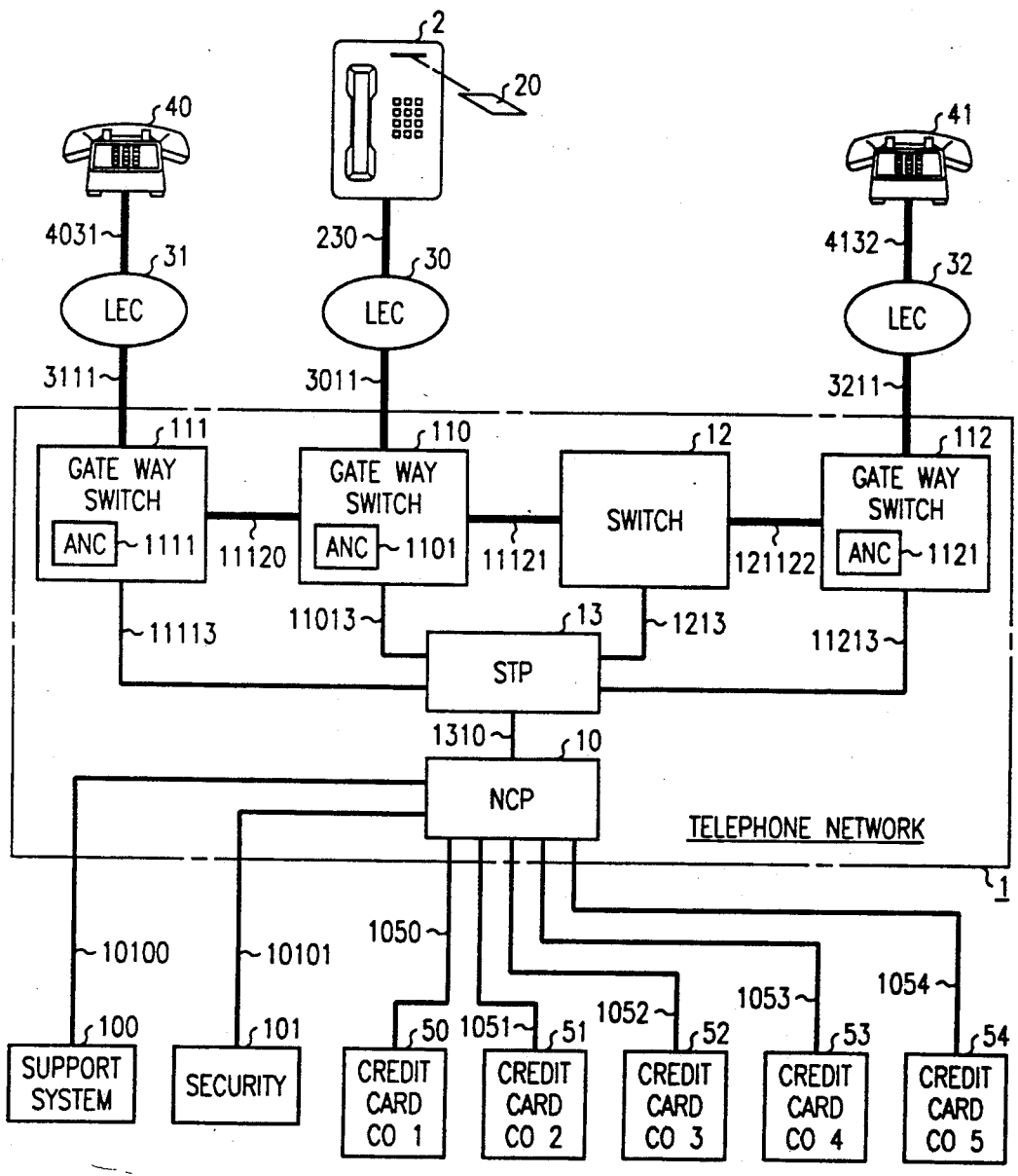
FIG. 1 illustrates an illustrious embodiment of a telephone network for establishing telephone connections in response to dialed telephone numbers identified with ones of a number of credit card numbers.

In an exemplary embodiment of the invention, telephone network 1 is arranged to establish connections between calling and called telephones 2, 40, 41 in accordance with dialed telephone numbers identified by calling party credit cards. Telephone network 1 may be any one of a number of telephone networks, such as the AT&T Telephone Network. Typically, such telephone networks have switches 110, 111, 112 and 12 which are controlled by data messages transmitted by signal transfer point 13, via data links 11013, 11113, 11213 and 1213 to set up telephone connections on network trunks 11120, 11121, and 121122 between calling and called telephones 2, 40, 41 served by network 1.

Certain telephone network switches are designated gateway switches 110, 111, 112 and function to enable access of local exchange carriers 30, 31, 32, such as local telephone companies, access to telephone network 1. Gateway switches may be any of a number of well-known types of telephone switching equipment, such as AT&T 4 ESS ™ and 5 ESS ® electronic equipment switching systems or automated operator systems, arranged to selectively interconnect trunks 3011, 3111, 3211 incoming from local exchange carriers 30, 31, 32 with network trunks 11120, 11121, 121122.

Each telephone network switch 12, 110, 111, 112 is interconnected by data links 1213, 11013, 11113, 11213 of the well-known common channel signaling network with a signal transfer point 13 which is arranged to exchange data messages with network switches 12, 110, 111, 112 and which data messages are used to control network switches 12, 110, 111, 112 to interconnect calling telephone 2 with called telephones 40, 41. Telephone network 1 is also assumed to have a number of centralized data bases, sometimes called network control points 10, positioned at various locations within telephone network 1 and which are interconnected either directly by data links similar to data links 1213, 11013, 11113, 11213 to network switches 12, 110, 111, 112 or by data link 1310 to signal transfer point 13.

Figure 2:
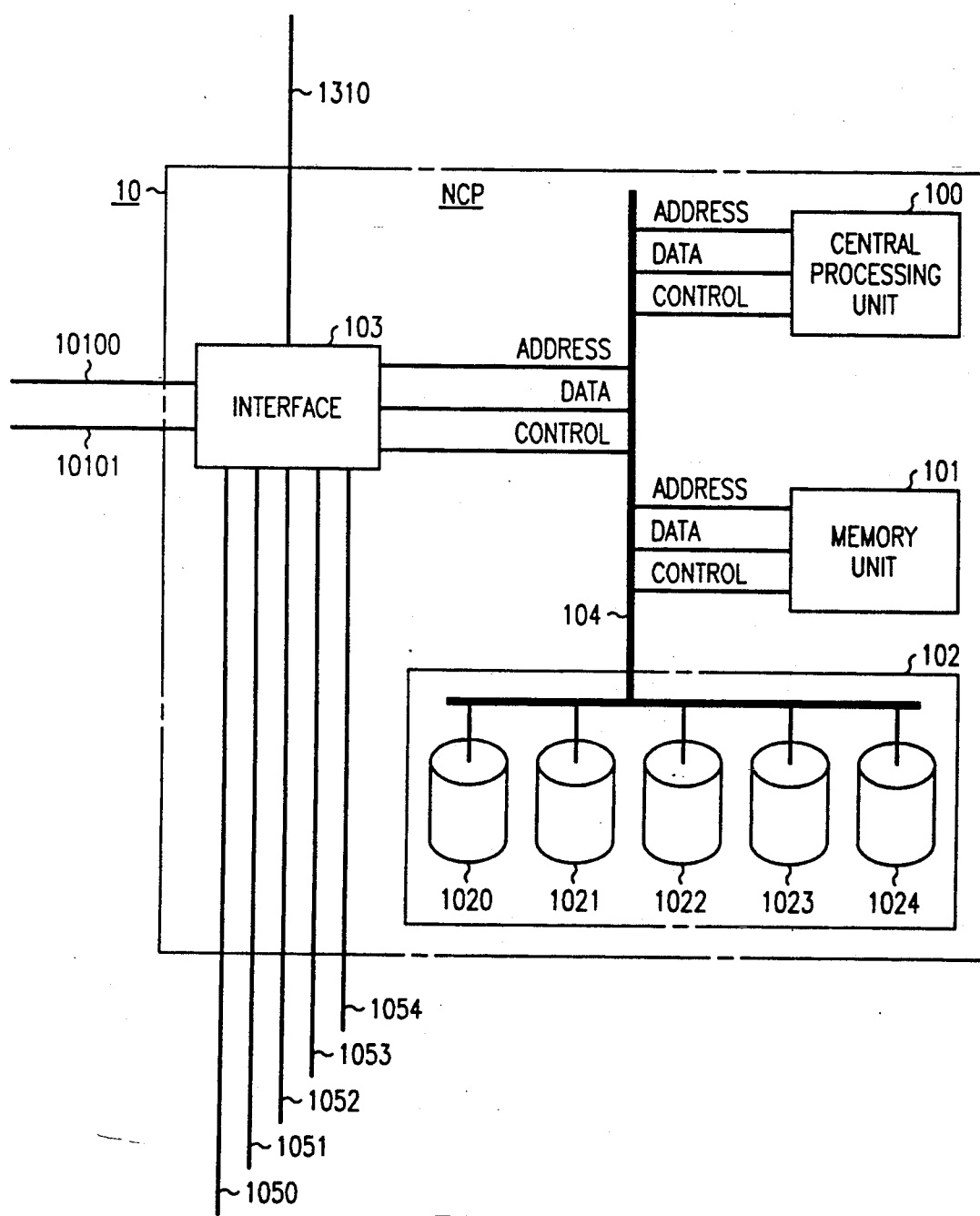
FIG. 2 is a block diagram of the network control apparatus used in the telephone network for identifying valid received credit card numbers, FIGS. 3 through 5 set forth an illustrative section of data recorded by the network control apparatus set forth in FIGS. 1 and 2.

Network control point 10, FIG. 2, has computers that may be, although not limited thereto, a computer such as an AT&T 1B or 3B20 simplex or duplex computer. Such computers need not be described in detail for an understanding of the invention and in general have a programmed central processor unit 100, memory unit 101, and an interface unit 103 each connected by address, data and control leads to a data bus 104. Interface unit 103 couples data links 1310 interconnected with signal transfer point 13, FIG. 1, data links 10100, 10101 interconnected with support system 100 and security system 101, respectively, and data links 1050 through 1054 interconnected with data base systems 50 through 54 owned and maintained by various credit card companies with data bus 104, FIG. 2, so that data may be exchanged with central processor unit 100 and memory unit 101. Data bus 104 is also interconnected with mass data storage device 102 which includes data base infrastructures 1020 through 1024 and which are interconnected by address, data and control leads with data bus 104.

Support system 100 coupled with data link 10100, FIG. 1, may be any of a number of well-known computer terminals, sometimes referred to as personal computers or large computers, that are coupled to interface unit 103, FIG. 2, so that update and maintenance data may be entered into and read from central processor unit 100, memory unit 101, and data base infrastructures 1020 through 1024. Similarly, security system 101, coupled with data link 10101, may be any of a number of well-known computer systems or terminals, sometimes referred to as personal computers, that are coupled to interface unit 103. Information in the form of security data relating to fraudulent credit cards, or the use thereof, may be entered into and read from central processor unit 100, FIG. 2, memory unit 101, and data base infrastructures 1020 through 1024.

Credit card companies 1 through 5, FIG. 1, may be any number of bank or financial companies having issued credit cards each identified by a credit card number and which companies maintain unique, national or international data bases 50 through 54 associated therewith. Each credit card company data base has the identity of each credit card and associated credit card number issued by the credit card company stored therein along with information identifying the current validation status of the credit card. The credit card company data bases 50 through 54 are each connected by a data links 1050 through 1054 with network control point 10. Data bases 50 through 54 may be, although not limited thereto, any of a number of well-known independent computer systems that are coupled by their associated data links 1050 through 1054 to interface unit 103, FIG. 2, of control network control point 10.

Memory unit 101 is used to store programs that control central processor unit 100 in the operation of network control point 10 and mass data storage device 102 is used to store data, such as subroutines 1010, 1011, and 1012, FIGS. 3 through 5, that are used in association with programs controlling the operation of central processor unit 100.

In the instant embodiment of the invention, FIG. 1, it is assumed that a calling party is located at telephone 2 which is connected by a telephone line 230 to and served by a local telephone company hereinafter called local exchange carrier 30. Local exchange carriers 30, 31, 32 are connected by trunks to telephone network switches each of which are herein identified as gateway switches 110, 111, 112 and serve to interface local exchange carriers 30, 31, 32 with telephone network 1.

Telephone 2 may be a standard telephone, a public coin telephone or a special telephone arranged to accept a calling party credit card in order that the calling party may place a telephone call on telephone network 1. A calling party initiates a telephone call to a called telephone 40, 41 by placing telephone 2 in an off-hook condition and in the well-known manner dialing the telephone number of a called telephone 40, 41 followed by the credit card number of a calling party credit card 20. The dialed telephone number and credit card number is received by serving local exchange carrier 30 over telephone line 230. A switching office of local exchange carrier 30, having received the dialed information, generates the telephone number assigned calling telephone 2 and transmits the dialed telephone number and received credit card number along with the generated calling telephone number over trunk 3011 to gateway switch 110. In the event a calling party generates the telephone call through a telephone network operator, the operator requests that the credit card number be verbally or electronically sent over the telephone connection after transmission of the calling and dialed called telephone numbers and is subsequently received by gateway switch 110.

Gateway switch 110 responds to the receipt of the telephone numbers and of the credit card number by formulating a data message containing the identified telephone number of called telephone 40, 41 and the received credit card number, and in some cases the calling telephone number, and transmits the data message over data link 11013 to signal transfer point 13. Signal transfer point 13, in turn, transmits the received data message over data link 1310 to network control point 10. In accordance with the illustrious embodiment of the invention, network control point 10 is programmed for use with telephone network 1 for controlling telephone network 1 to establish connections between calling telephone 2 and called telephones 40, 41 in accordance with dialed telephone numbers and received calling party credit card numbers.

Figure 6:
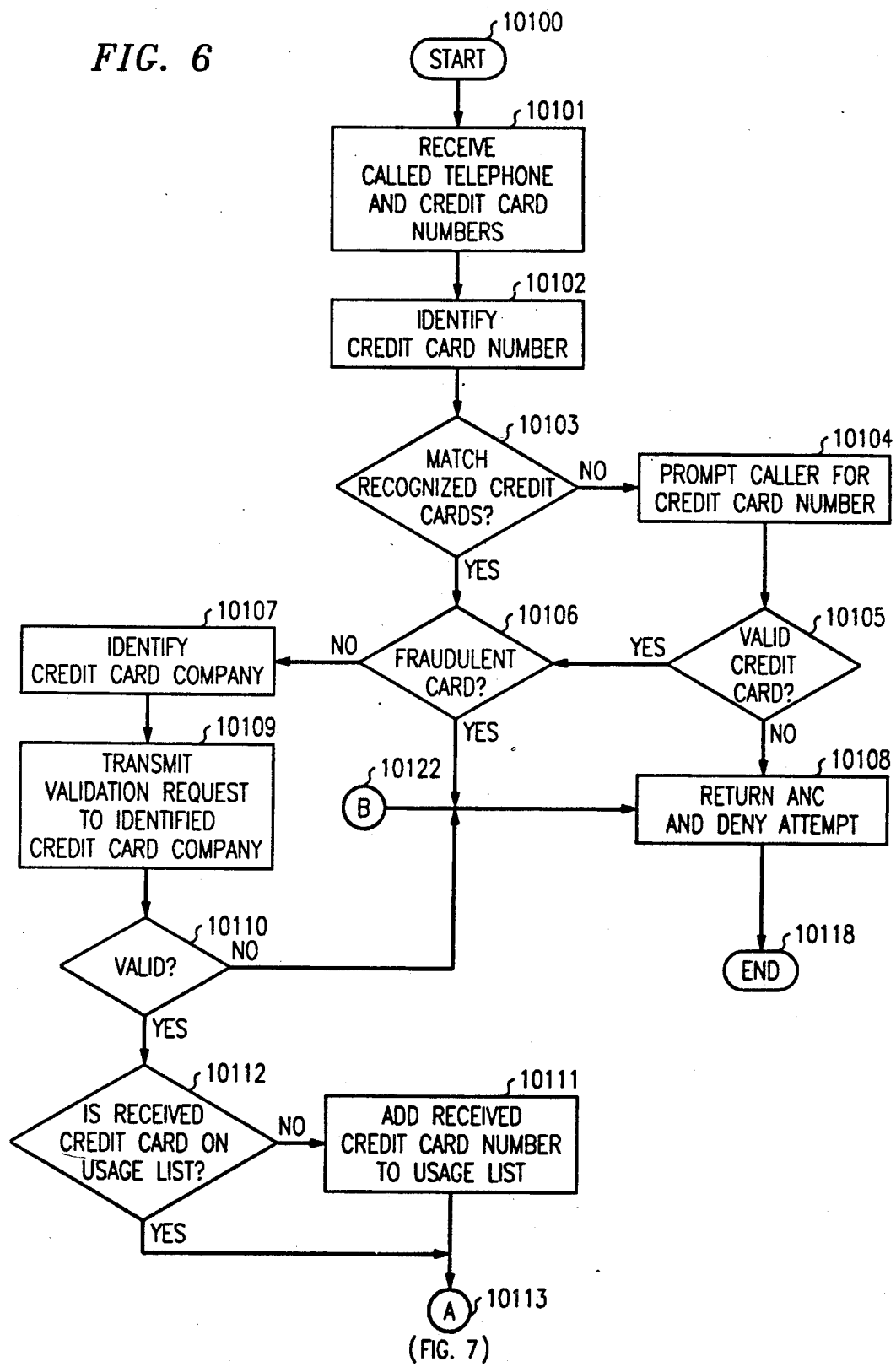
FIGS. 6 and 7 illustrates a flow chart of the operation of the network control apparatus set forth in FIGS. 1 and 2 in accordance with principles of the invention.

Upon receipt of the data message incoming on data link 1310, FIG. 6, steps 10100, 10101, central processor unit 100 of network control point 10, FIG. 2, operating in accordance with programmed instructions stored in memory 101 and mass store 102, FIG. 2, reads the data message, via data bus 104, into memory unit 101. Each credit card company has a unique identification stratagem for identifying credit cards issued by them to their card holders. For example, it is assumed that credit card company CO1, FIG. 3, subroutine 1010, has a field in each of their credit cards assigned the number 891288 for use in identifying credit cards issued by credit card company CO1. Subroutine 1010 also identifies that data link 1050, FIG. 1, interconnects network control point 10 with credit card company CO1 data base 50 and is to be used in determining the validity of a credit card company CO1 credit card used in placing a telephone call on telephone network 1. Subroutine 1010, FIG. 3, also records identification classification fields 4XXXXX, 52XXXX, 340349, and 620XXX used in identifying credit cards issued by credit card companies CO2 through CO5, respectively, and the associated validation data links 1051, 1052, 1053, 1054 interconnecting network control point 10, FIG. 1, with each credit card company data base 51 through 54.

After receiving a credit card used in placing a telephone call on telephone network 1, central processor unit 100, identifies the received credit card number, FIG. 6, step 10102. It is assumed that a calling party, FIG. 1, located at calling telephone 2, assigned the telephone number 614-555-YYYY, has dialed telephone number 206-555-ZZZZ assigned to called telephone 41 and is using a credit card assigned the credit card number 8912-88XX-XXXX-XXXX. Network control point central processor unit 100, FIG. 2, matches a predetermined portion of the received credit card number 8912-88XX-XXXX-XXXX with prerecorded identification classifications set forth in subroutine 1010, FIG. 3, each identifying a credit card company having issued credit cards having access to telephone network 1, FIG. 6, step 10103.

If the received credit number should fail to match one of the prerecorded identification classifications set forth in subroutine 1010, step 10104, central processor unit 100, FIG. 2, formulates a control message which is transmitted to gateway switch 110, FIG. 1, via signal transfer point 13 and data links 1310, 11013, to enable announcement circuit 1101 of gateway switch 110 to prompt the calling party to repeat the credit card number. When there is a failure to match the prompted credit card number with one of the prerecorded identification classifications set forth in subroutine 1010, network control point central processor unit 100, FIG. 6, step 10105, determines that the received credit card number does not identify a valid credit card. Another control message is transmitted via signal transfer point 13, FIG. 1, and data links 1310, 11013 to gateway switch 110 which responds thereto by enabling announcement circuit 1101 to transmit a message to the calling party at telephone 2 denying the use the credit card number in placing a telephone call on telephone network 1, FIG. 6, step 10108. Gateway switch 110 then disconnects from the connection step 10118.

When there is a match of a predetermined portion of either the received or prompted credit card number 8912-88XX-XXXX-XXXX with a prerecorded identification classification field 891288 set forth in subroutine 1010, FIG. 3, network control point processor unit 100, FIG. 6, steps 10103, 10105, determines that the received credit card number identifies a valid credit card and initiates a sequence to determine if the identified credit card is fraudulent, step 10106. Subroutine 1010, FIG. 3, recognizes that the received credit card number 8912-88XX-XXXX-XXXX identifies credit card company CO1, FIG. 3, as having issued the identified credit card and enables network control point central processor unit 100, FIG. 2, via data bus 104 and interface unit 103, over data link 1050, FIG. 1, to establish a data connection with identified credit card company data base 50.

Network control point central processor 100, FIG. 2, formulates a request for a validity check of the received credit card number and transmits the request over the established data link 1050 connection, FIG. 1, to the identified credit card company CO1 data base 50, FIG. 6, step 10109. If the information returned by credit card company data base 50 to network control point 10 identifies non-validation of the credit card identified by the received or prompted credit card number, FIG. 6, step 10110, a data message is generated and transmitted to gateway switch 110, FIG. 1, controlling gateway switch announcement circuit 1101 to return a voice message to calling telephone 2 denying the use of the credit card number in placing a telephone call on telephone network 1, FIG. 6, step 10108. Gateway switch 110 then disconnects from the connection step 10118.

When receiving information identifying validation of the received credit card number 8912-88XX-XXXX-XXXX, step 10110, over the established data link 1050 connection, network control point 10 proceeds to determine if there is possible fraudulent usage of the credit card identified by the received credit card number in placing telephone calls on telephone network 1 within a predefined interval of time. A usage subroutine 1012, FIG. 5, is maintained by network control point 10 to indicate the usage of certain credit cards in placing a large number of telephone calls on telephone network 1 within a predetermined period of time. For example, a lost or stolen credit card, which may or may not have been reported as lost or stolen to the credit card company having issued the credit card, may be fraudulently used to place a large number of telephone calls on telephone network 1 within a short period of time. Subroutine 1012 enables network control point 10 to identify credit cards used in placing large number of calls and the credit card company having issued such credit cards.

In addition, subroutine 1012 records time periods used in determining fraudulent use of credit cards. The time period varies for different credit cards. Thus, a credit card assigned for corporate use by a sales person who makes a lot of sales calls in a day and phones in customer orders to a home office may be assigned a time period of four hours. If the usage of such a credit card, for example credit card 8912-88XX-XXXX-XXXX, exceeds a threshold count of 70 telephone calls within the four-hour time period, then usage of the credit card is excessive and there may be possible fraud involved in use of the credit card. When 45 telephone calls are made within the four-hour time period and the number is less than threshold 70, it is determined that usage does not exceed the threshold and no fraud is involved. When a credit card is assigned to a person who makes few call telephone calls, a longer time period of twelve hours and a threshold of seven may be assigned to credit card 620XXX-XXXX issued by credit card company CO5. If, during the twelve-hour time period, central processor unit 100 determines that the usage of credit card number 620XXX-XXXX in placing telephone calls on telephone network 1 has exceeded the predefined threshold number 7 within the predefined time interval of twelve hours, subroutine 1012 is updated to indicate that usage of credit card 620XXX-XXXX has exceeded threshold 7 and that possible fraud may be involved in the excessive use of credit card 620XXX-XXXX.

Thus, when subsequent telephone calls are made using credit card 620XXX-XXXX, central processor unit 100 determines that the threshold number 7 has been exceeded and that a question of fraud may be involved. In such cases, central processor unit 100, FIG. 2, formulates a data message and transmits the data message via data links, 1310, 11013, FIG. 1, and signal transfer point 13 to gateway switch 110 to inform the calling party that credit card 620XXX-XXXX may not be used in placing the telephone call on telephone network 1. Once network control point central processor unit 100 has identified the received credit card number 620XXX-XXXX as having a possible fraudulent usage, a data connection is established over data link 10101 with security organization 101. The identified fraudulent credit card number 620XXX-XXXX and the telephone number assigned calling telephone 2 is transmitted thereto to aid security organization 101 in appropriate action in investigating the possible fraudulent use of credit card 620XXX-XXXX.

When a data message is returned from credit card company CO1 data base 50 indicating that the received credit card number 8912-88XX-XXXX-XXXX identifies a valid credit card, central processor unit 100, FIG. 6, step 10112, determines if received credit card number 8912-88XX-XXXX-XXXX is recorded in usage subroutine 1012. If the received credit card number is not recorded in usage subroutine 1012, NCP 10 records the received credit card number therein, step 10111, and an appropriate time period, FIG. 5, and threshold number is assigned thereto. When the received credit card number is recorded in usage subroutine 1012, FIG. 6, step 10112, or is added thereto, step 10111, the usage count increases, FIG. 5, subroutine 1012, as indicated by the calls per time period, by 1, FIG. 7, step 10114.

Figure 7:
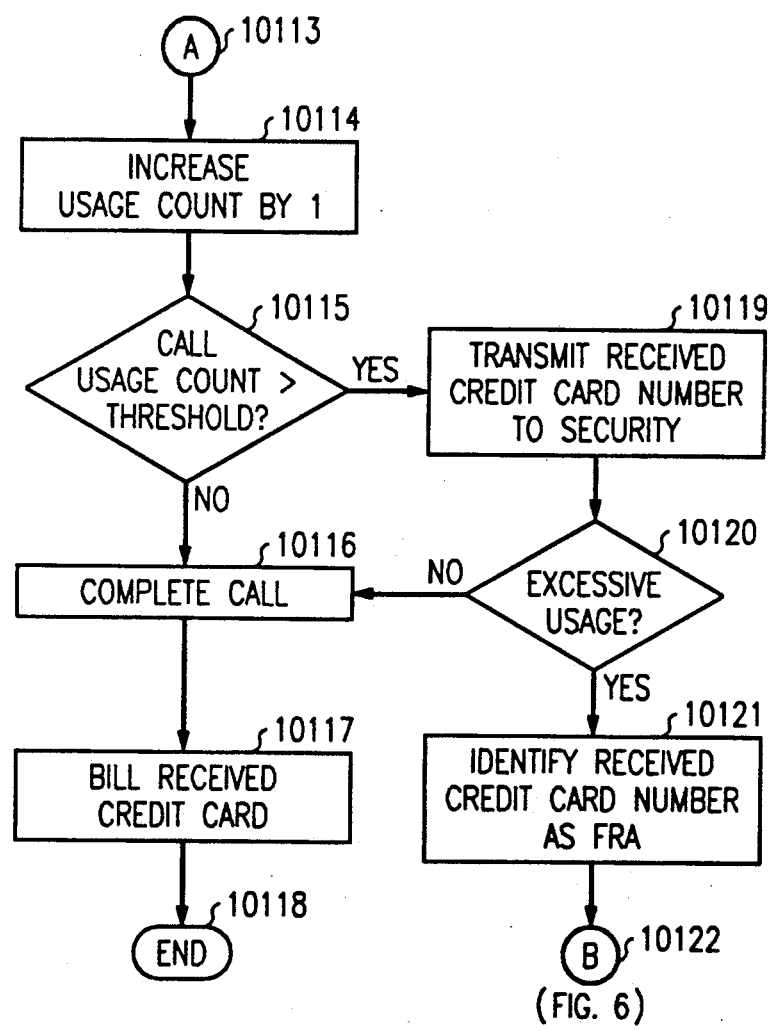

Upon determining that the calls per time period usage of 45 for received credit card 8912-88XX-XXXX-XXXX is less than or equal to the assigned threshold number 70 recorded in usage subroutine 1012, FIG. 5, network control point 10, FIG. 1, enables gateway switch 110 to initiate establishment of the telephone call connection, FIG. 7, steps 10115, 10116. Network control point 10, FIG. 1, formulates a data message and transmits the data message via signal transfer point 13 and data links 1310, 11013 to gateway switch 110. Gateway switch 110 responds to the enabling data message by initiating the call set-up sequence wherein data messages are transmitted to signal transfer point 13 and over data links 11013, 1213, 11213 to control gateway switches 110, 112, and switch 12 to establish a telephone connection between calling telephone 2 and called telephone 41. The telephone connection extends from calling telephone 2 over telephone line 230, through local exchange carrier 30 and trunk 3011 to gateway switch 110. The telephone connection extends through gateway switch 110, over trunks 11121, 121122, via switch 12, through gateway switch 112, over trunk 3211, via local exchange carrier 32 and telephone line 4132 to called telephone 41.

Central processor unit 100 subroutine 1011, FIG. 4, indicates that a valid received credit card 8912-88XX-XXXX-XXXX was used to place a telephone call from a calling telephone station assigned telephone number 614-555-YYYY to a called telephone assigned telephone number 206-555-ZZZZ. There was apparently no fraud involved and the call connection was completed. Billing apparatus, not shown, records the origination, destination, and length of the telephone call and transmits billing information to identified credit card company CO1 so that a charge for the completed telephone call can be billed against the credit card identified by the received credit card number 8912-88XX-XXXX-XXXX.

When a credit card assigned the credit card number 620XXX-XXXX has a call usage count 9 exceeding a predefined threshold of 7, FIG. 7, steps 10115, 10119, the received credit card number 620XXX-XXXX, FIG. 1, is transmitted over data link 10101 to security organization 101 and from on-line information received therefrom is determined if there has been excessive usage, step 10120. In some instances, a calling party may have requested credit card company CO5 to temporarily increase the threshold limitation or the security organization may determine that a small increase of the call usage time during the threshold time period may be warranted. In accordance with information received from security organization 101, network control point 10, FIG. 7, step 10120, may identify the received credit card number 620XXX-XXXX as fraudulent, step 10121, and updates subroutines 1011, 1012, FIGS. 4, 5. In such event, network control point central processor unit 100, FIG. 1, controls gateway switch 110 to return an announcement denying the call attempt and disconnects from the call connection, FIGS. 7, 6, steps 10122, 10118.

Even though the call usage count has exceeded the threshold limit, FIG. 7, step 10115, security organization 101 may determine that the call attempt may proceed, step 10120. Thus, network control point central processor unit 100, steps 10116, 10117, 10118, controls gateway switch 110, FIG. 1, to complete a call telephone connection between calling telephone station 2 and called telephone station 40 via telephone line 230, local exchange carrier 30, trunk 3011 to gateway switch 110. The call connection is continued through gateway switch 110 over trunk 11120, through gateway switch 111, trunk 3111, local exchange carrier 31 and over telephone line 4031 to called telephone 40.

It is obvious from the foregoing that the flexibility, economy, and efficiency of telephone networks may be substantially enhanced by on-line apparatus arranged to control a telephone network to establish connections between calling and called telephone stations in accordance with dialed telephone numbers identified with any one of a number of calling party credit cards.

We claim:

1. A telephone network for establishing connections between calling and called telephones in accordance with dialed telephone numbers identified with ones of a plurality of calling party credit cards comprising means having data links interconnecting the telephone network with a plurality of data bases each maintained by a credit card company and which is responsive to receipt of a telephone number and a credit card number dialed from a calling telephone for identifying a company having issued a credit card assigned the received credit card number and for transmitting the received credit card number over one of the data links to a data base maintained by the identified company for a determination of validity and wherein said means determine fraudulent use of the credit card used in placing calls within various periods of time, and means for establishing a network connection between the calling telephone and a telephone identified by the called telephone number upon receiving validation of the validity and determining non-fraudulent use of the credit card and for establishing a network connection between the calling telephone and an announcement circuit stating that the identified credit card cannot be used for telephone calls upon receiving non-validation and upon determining fraudulent use of the credit card.

2. The telephone network set forth in claim 1 wherein said identifying and transmitting means comprises means for matching a predetermined portion of the received credit card number with prerecorded identification classifications each identifying a credit card company having issued credit cards having access to the telephone network.

3. The telephone network set forth in claim 2 wherein said identifying and transmitting means comprises means enabled upon a failure to match the received credit card number with any of said prerecorded identification classifications for prompting the calling telephone for the credit card number and upon a failure to match the prompted credit card number with one of the prerecorded identification classifications for denying the use of the received credit card number in placing a telephone call on the telephone network.

4. The telephone network set forth in claim 3 wherein said identifying and transmitting means comprises means enabled upon a match of the received credit card number with one of the prerecorded identification classifications for identifying a credit card company having issued a credit card assigned the received credit card number and for establishing a data connection over one of the data links with the identified credit card company maintained data base.

5. The telephone network set forth in claim 4 wherein said identifying and transmitting means comprises means for transmitting a request for a validity check of the credit card assigned the received credit card number over the established data link connection to the data base maintained by the identified credit card company.

6. The telephone network set forth in claim 5 wherein said establishing means comprises means enabled upon receiving information identifying non-validation of the credit card from the identified credit card company for denying the use of the received credit card number in placing a telephone call on the telephone network.

7. The telephone network set forth in claim 6 wherein said establishing means comprises means enabled upon receiving on-line information identifying validation of the dialed credit card number over the established data link connection from the identified credit card company for determining usage of the credit card in placing telephone calls on the telephone network within the predefined intervals of time.

8. The telephone network set forth in claim 7 wherein said establishing means comprises means enabled upon determining that said usage has exceeded a predefined threshold number within a predefined time interval for identifying the received credit card number as fraudulent and denying use of the credit card in placing a telephone call on the telephone network.

9. The telephone network set forth in claim 8 wherein said establishing means comprises means enabled upon determining that said usage is less than and equal to said predefined threshold number for establishing a network connection between the calling telephone and a telephone identified by the called telephone number wherein a billing charge for said dialed telephone call is to be billed against the credit card number.

10. The telephone network set forth in claim 8 wherein said establishing means comprises means enabled upon identifying the credit card associated with the received credit card number as fraudulent for establishing a data connection with a security organization and transmitting said identified fraudulent credit card number and calling telephone number thereto.

11. A telephone network for establishing connections between calling and called telephones in accordance with dialed telephone numbers identified with ones of a plurality of calling party credit cards comprising means having data links interconnecting the telephone network with a plurality of data bases each maintained by a credit card company and which is responsive to receipt of a telephone number and a credit card number dialed from a calling telephone for identifying a credit card and a company having issued a credit card associated with the received credit card number and for transmitting the received credit card number to the identified credit card company for a determination of the validity of the credit card, means enabled upon receiving information identifying validity of the credit card from the identified credit card company for determining usage of the credit card in placing telephone calls on the telephone network within predefined intervals of time, means enabled upon determining that said usage has exceeded a predefined threshold number of telephone calls within a predefined time interval for identifying the credit card as fraudulent, and means for establishing a network connection between the calling telephone and a telephone identified by the dialed telephone number upon receiving validation of the validity of the credit card and for establishing a network connection between the calling telephone and an announcement circuit stating that the credit card cannot be used for telephone calls upon receiving non-validation of the credit card and upon identifying the credit card as fraudulent.

12. Apparatus for use with a telephone network for controlling the telephone network to establish connections between calling and called telephones in accordance with telephone numbers identified with ones of a plurality of calling party credit cards comprising means connected with and responsive to receipt of a telephone number and a credit card number from the telephone network for identifying a credit card associated with the received credit card number and a credit card company having issued the credit card and for establishing a data connection over a data link connecting the telephone network with a data base maintained by the identified credit card company and transmitting the received credit card number to the identified credit card company data base for a determination of validity of the identified credit card, means enabled upon receiving information identifying non-validation of the credit card from the identified credit card company data base for controlling the telephone network to deny use of the credit card in placing a telephone call on the telephone network, means enabled upon receiving information identifying validation of the credit card from the identified credit card company for determining usage of the credit card in placing telephone calls on the telephone network within predefined intervals of time and upon determining that said usage has exceeded predefined threshold numbers of telephone calls within the predefined time intervals for identifying the credit card as fraudulent, and means for controlling the telephone network to establish a network connection between the calling telephone and a telephone identified by the telephone number upon receiving validation of the credit card and determining that said usage is less than or equal to said threshold number and to establish a network connection between the calling telephone and an announcement circuit stating that the credit card cannot be used for telephone calls upon determining said usage has exceeded said threshold numbers within the predetermined intervals of time.

13. A telephone network for establishing connections between calling and called telephone in accordance with dialed telephone numbers identified by calling party credit cards comprising means responsive to receipt of a telephone number and a credit card number dialed from a calling telephone for matching a predetermined portion of the received credit card number with prerecorded identification classifications each identifying a credit card company having issued credit cards having access to the telephone network, means enabled upon a failure to match the received credit card number with any of said prerecorded identification classifications for prompting the calling telephone for the credit card number and upon a failure to match the prompted credit card number with one of the prerecorded identification classifications for denying use of the received credit card number in placing a telephone call on the telephone network, means enabled upon a match of the received credit card number with one of the prerecorded identification classifications for identifying a credit card assigned the received credit card number and the credit card company having issued the identified credit card and for establishing a data connection over a data link connecting the telephone network with a data base maintained by the identified credit card company data base, means for transmitting a request for a validity check of the credit card over the established data link connection with the credit card company, means enabled upon receiving information identifying non-validation of the credit card from the credit card company for denying use of the received credit card number in placing a telephone call on the telephone network, means enabled upon receiving information identifying validation of the credit card over the established data connection for determining usage of the credit card in placing telephone calls on the telephone network within predefined intervals of time, means enabled upon determining that said usage has exceeded predefined threshold numbers of telephone calls within the predefined time intervals for identifying the credit card as fraudulent and denying use of the credit card in placing a telephone call on the telephone network, and means enabled upon determining that said usage is less than and equal to said predefined threshold numbers for establishing a network connection between the calling telephone and a telephone identified by the received telephone number wherein a charge for said connection telephone is to be billed to the credit card.

14. A method of operating a telephone network for establishing connections between calling and called telephones in accordance with telephone numbers identified by ones of a plurality of calling party credit cards comprising the steps of receiving a telephone number and a credit card number from a calling telephone and identifying a credit card assigned the received credit card number and a company having issued the identified credit card and transmitting the received credit card number to the identified company over a data link connecting the telephone network with a data base maintained by the identified company for a determination of the validity of the credit card, determining usage of the credit card in placing telephone calls on the telephone network within predefined intervals of time and identifying the credit card as fraudulent when the usage has exceeded predefined threshold numbers of telephone calls within the predefined time intervals, establishing a network connection between the calling telephone and a telephone identified by the received telephone number upon receiving validation of the validity of the credit card and after determining that the usage is less than and equal to the threshold numbers and establishing a connection between the calling telephone and an announcement circuit stating that the credit card cannot be used for telephone calls upon receiving non-validation of the credit card and upon identifying the credit card as fraudulent.

15. The method of operating the telephone network set forth in claim 14 further comprising the step of establishing an on-line data connection with a security organization and transmitting the received credit card number of an identified fraudulent credit card number and calling telephone number of the calling telephone thereto.

16. A method of operating a telephone network for establishing connections between calling and called telephones in accordance with telephone numbers identified with ones of a plurality of calling party credit cards comprising the steps of receiving a telephone number and a credit card number from a calling telephone and matching a predetermined portion of the received credit card number with prerecorded identification classifications each identifying a credit card company having issued credit cards having access to the telephone network, prompting the calling telephone station for the credit card number upon a failure to match the received credit card number with one of the prerecorded identification classifications and denying use of the received credit card number in placing a telephone call on the telephone network when the prompted credit card number fails to match one of the prerecorded identification classifications, identifying a credit card assigned the received credit card number and a company having issued the identified credit card and establishing a data connection over a data link connecting the telephone network with a data base maintained by the company upon a match of the predetermined portion of the received credit card number with one of the prerecorded identification classifications, denying use of the identified credit card in placing a telephone call on the telephone network upon receiving information identifying non-validation of the credit card from the company, determining usage of the credit card in placing telephone calls on the telephone network within predefined intervals of time upon receiving information identifying validation of the credit card over the established data connection, identifying the credit card as fraudulent and denying use of the identified fraudulent credit card in placing a telephone call on the telephone network upon determining that the usage has exceeded predefined threshold numbers of telephone calls within the predefined time intervals, and establishing a network connection between the calling telephone and a telephone identified by the received telephone number upon receiving validation of the validity of the credit card and after determining that the usage is less than and equal to ones of the threshold numbers and establishing a connection between the calling telephone and an announcement circuit stating that the credit card cannot be used for telephone calls upon receiving non-validation of the credit card and upon identifying the credit card as fraudulent.

* * * * *